United States Patent [19]
Hildebrand et al.

[11] Patent Number: 5,601,142
[45] Date of Patent: Feb. 11, 1997

[54] HEATER OR AIR CONDITIONING UNIT, IN PARTICULAR FOR INSTALLATION IN A MOTOR VEHICLE

[75] Inventors: Reinhard Hildebrand, Redwitz; Siegfried Petters, Weitramsdorf, both of Germany

[73] Assignee: Valeo Klimasysteme GmbH, Rodach, Germany

[21] Appl. No.: 358,434

[22] Filed: Dec. 19, 1994

[30] Foreign Application Priority Data

Dec. 20, 1993 [EP] European Pat. Off. ............ 93120557

[51] Int. Cl.⁶ .................................................. B60H 1/00
[52] U.S. Cl. ..................... 165/42; 165/137; 454/121; 454/160; 237/12.3 A
[58] Field of Search .................. 237/12.3 A, 12.3 B; 454/121, 126, 160; 165/137, 42, 43

[56] References Cited

U.S. PATENT DOCUMENTS

| | | | |
|---|---|---|---|
| 4,406,214 | 9/1983 | Sakurai | 454/126 |
| 4,582,252 | 4/1986 | Ogihara et al. | 237/12.3 A |
| 4,593,852 | 6/1986 | Tajima et al. | 237/12.3 A |
| 4,852,638 | 8/1989 | Hildebrand et al. | 165/42 |
| 5,016,704 | 5/1991 | Ono | 165/137 |
| 5,042,566 | 8/1991 | Hildebrand et al. | 454/160 |
| 5,173,078 | 12/1992 | Robin et al. | 454/126 |
| 5,217,405 | 6/1993 | Tanaka | 454/121 |
| 5,399,120 | 3/1995 | Burns et al. | 454/121 |

FOREIGN PATENT DOCUMENTS

| | | |
|---|---|---|
| 0397997 | 12/1989 | European Pat. Off. . |
| 2583000 | 12/1986 | France . |
| 2631896 | 12/1989 | France . |
| 2526780 | 12/1976 | Germany . |
| 8715554.0 | 5/1989 | Germany . |

Primary Examiner—Edward K. Look
Assistant Examiner—Mark Sgantzos
Attorney, Agent, or Firm—Kenyon & Kenyon

[57] ABSTRACT

A heater or air conditioning unit is able to efficiently deliver air at a low noise level. The unit is manufactured in accordance with the "component sharing principle," whereby it is provided with an installation space capable of accepting an evaporator for air conditioning, or air-guide devices. The air-guide devices route the incoming air flow without inducing turbulence.

21 Claims, 6 Drawing Sheets

HEATER OR AIR CONDITIONING UNIT, IN PARTICULAR FOR INSTALLATION IN A MOTOR VEHICLE

BACKGROUND OF THE INVENTION

The invention relates to a heater or air conditioning unit, in particular for installation in a motor vehicle. The unit has a housing that receives an evaporator for an air conditioner or an air guide device for a heater where the air guide device is arranged transverse to the incoming air flow to divide it into two output air flows without inducing turbulence.

An air conditioning unit having a housing, a feed-through duct and an installation space for an evaporator is disclosed by the EP-A1-O 397 997. The air flow discharged by a fan at the entrance of the unit housing in an air duct initially flows through an evaporator installed in the installation space of the unit housing, and is then either delivered directly as cool air or by way of a heat exchanger as warm air into a front-seat-area mixing chamber. The air is then routed as temperable air in accordance with the setpoint selection of an air-temperature adjusting element on the control unit inside the motor vehicle. The corresponding positioning of an air-mix flap in the front-seat-area mixing chamber determines whether the temperable air will be routed to a defrost air outlet, a floor air outlet, or a middle-level air outlet. The known device, also provides additional ride comfort using a rear-seat-area mixing chamber. This second mixing chamber is similarly fed on the input side, and the temperable air is able to be delivered into the middle level or into the floor area of the rear-seat area.

Another device, disclosed in FR-A-2 583 000, includes a motor-vehicle heating system having a heat exchanger arranged downstream from a radial fan. A profiled grid wall is arranged in the diffuser of the radial fan so as to allow at least one section of the profiled grid wall to extend in the direction of the radial fan into the diffuser. This helps to uniformly supply air to the heat exchanger and reduce noise.

SUMMARY OF THE INVENTION

The aim of the present invention is to create a heater unit in accordance with the so-called "component sharing principle" by using as many unaltered component parts of an air conditioning unit as possible. In this way, one dispenses with installing and connecting an evaporator, while optimizing operating characteristics. The result is an efficient and quiet heater unit that can be produced more easily and at a lower cost.

The air-guide device described in the present invention significantly reduces aerodynamic effects that produce unwanted noise and decrease efficiency. This is achieved in part by properly directing discharge-side air flows to control the rate of air flow around the air guide device in the deed-through duct.

The air-guide devices are conveniently designed and arranged to divert the incoming air flow into two output air flows. The first output air flow is directed through a feed-through duct to a heat exchanger arranged in the unit housing. The second output air flow is directed through the feed-through duct to an air mixing chamber. The air mixing chamber mixes the warm air from the heat exchanger with the cool air from the second output air flow. The air-flow device works in conjunction with movable doors to variably regulate the proportion of each of the output air flows reaching the mixing chamber, thus regulating the overall temperature of the mixed air before it passes into the interior compartment of motor vehicle.

The present invention is less expensive to manufacture because it is capable of accepting various air-flow devices of different design without having to make any design changes in the housing or installation chamber. It is also simpler to manufacture because each of the air-flow device designs can be installed using the same set of connector receptacles in the installation space. These receptacles are fixed to corresponding receptacles molded on the front ends of the air-device guide devices.

Each air-flow device can be easily installed in the same installation space that accepts the evaporator component when the unit is to be used as an air conditioner. The easy to use receptacles allow the device to be fixed in its operational position by inserting it laterally into the installation space, such that its air-guide elements are essentially directed transverse to the incoming air flow. This arrangement maximizes the utility of the air-flow device in properly diverting the incoming air into two output streams.

BRIEF DESCRIPTION OF THE DRAWINGS

The present invention, will be clarified in greater detail in the following on the basis of schematically depicted exemplary embodiments in the drawings.

DETAILED DESCRIPTION

Figure 1:
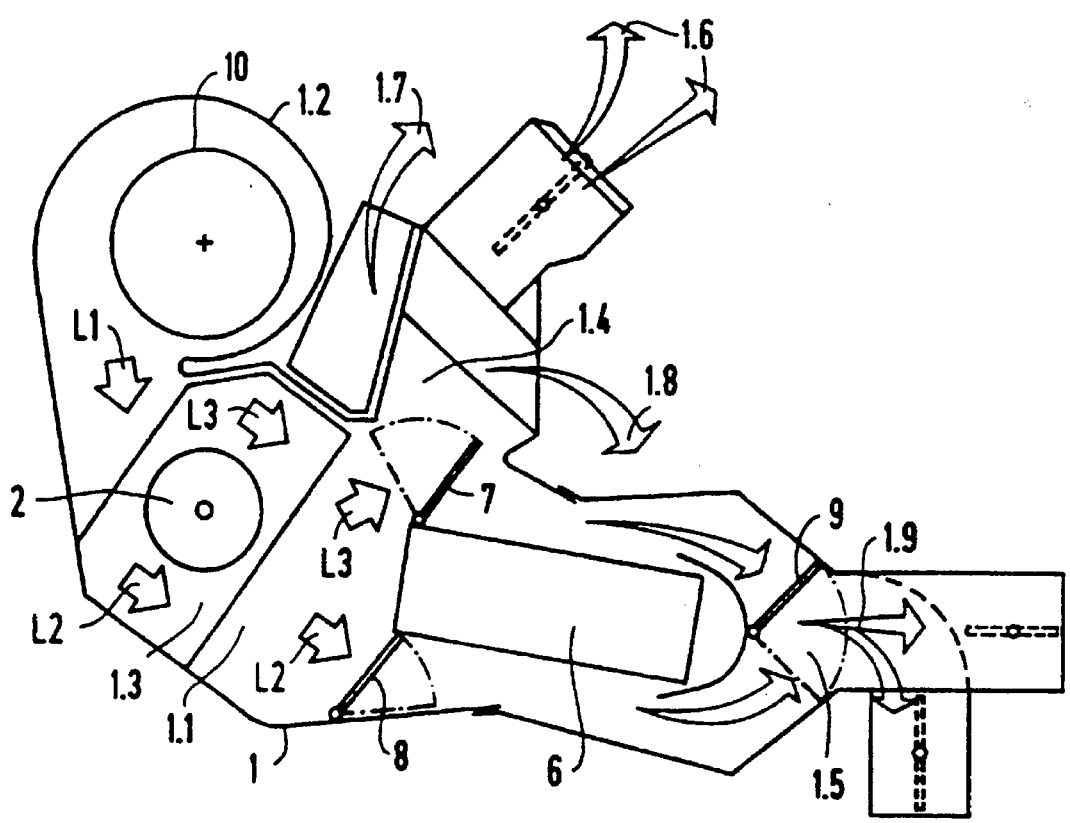
FIGS. 1 to 4 each show, in the longitudinal section of a unit housing, a different design of an air-guide device inserted laterally into an installation space for an evaporator.

FIGS. 1 to 4 show a lateral section of a plastic unit housing 1, which can be used according to the "component sharing principle" both for a heater unit as well as for a heater and air conditioning unit, in particular for installation in a motor vehicle. The feed-through duct 1.1 for the air flow leads from an inlet-side ventilating fan 10 having a spiral-shaped ventilating-fan housing part 1.2 through an installation space 1.3. When used as an air conditioning unit, an evaporator is inserted and fills up the entire installation space 1.3. Shut-off door 8 and the air mix door for the front seat area air mix door 7 are adjustable to regulate the flow of air past the heat exchanger 6, or into the mixing chamber for the front seat area 1.4. From mixing chamber 1.4, the air is diverted either to a front, mid-level air outlet into the motor vehicle, a defrost air outlet, or a floor outlet. The front seat area air mix door 7 is adjustable from a closed position that completely blocks fresh air from entering the mixing chamber 1.4, to an open position that completely blocks warm air from entering the mixing chamber 1.4. A rear seat area mixing chamber 1.5 is also provided, along with rear seat area air mix door 9. Door 9 can be adjusted to supply a greater or lesser amount of warm air from either side of heat exchanger 6 to the mixing chamber 1.5. From mixing chamber 1.5, the air is diverted either to a rear mid-level outlet or a rear, floor level outlet.

FIG. 1–4 show the components provided for the unit housing 1 to be used for a heater unit, in the case of which, given otherwise identical components, an air-guide device 2, 3, 4, or 5 is inserted laterally into the installation space 1.3 for the evaporator. The respective air-guide device 2, 3, 4, or 5 is inserted laterally into the installation space 1.3 with the longitudinal axis directed essentially transverse the incoming air flow L1. The air-guide device is able to be fixed in its operational position to advantageously form a well-directed output air flow L2 below the air-guide device in the direction of the heat exchanger 6, or form a well-directed output air flow L3 above the air-guide device in the direction of the mixing chamber 1.4. The advantages of the present invention are not restricted in this case to the depicted air intake at the inflow side; in the place of a middle ventilating fan, a laterally displaced arrangement or an air access through a laterally discharging duct can also be provided. In the same way, the air-duct construction behind the installation space for the evaporator is not narrowly restricted by the depicted exemplary embodiment.

The single representations according to FIG. 5–8 illustrate refinements according to the invention of the air-guide devices.

Figure 5:
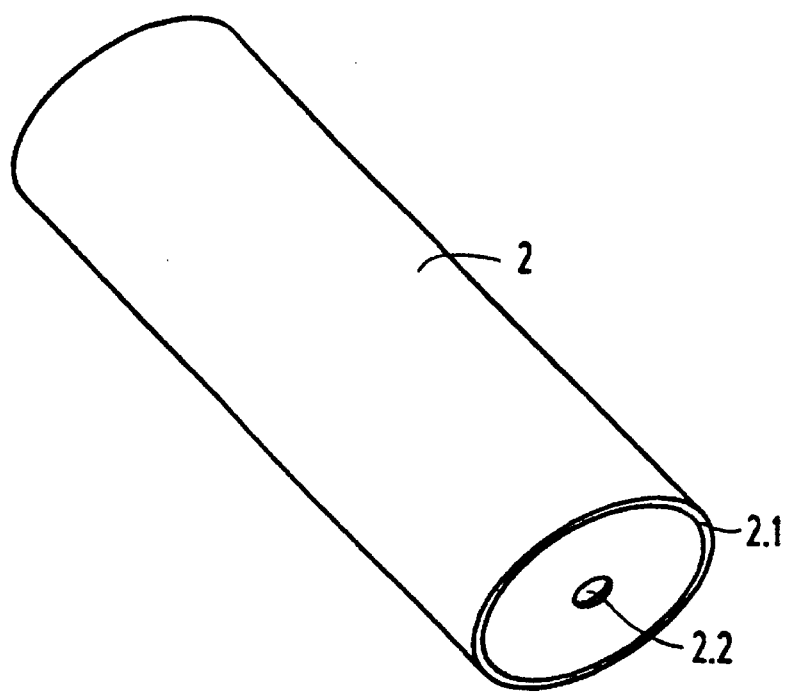
FIGS. 5 to 8 each show different refinements of the air-guide device, each in a perspective single representation.

FIG. 1 and FIG. 5 depict an air-guide device 2 of a cylindrical plastic roll body 2 arranged transverse to an incoming air flow L1, preferably injection-molded as a hollow part, with a first or second output-side air flow L2 or L3 diverted above or below the roll body 2.

Figure 2:
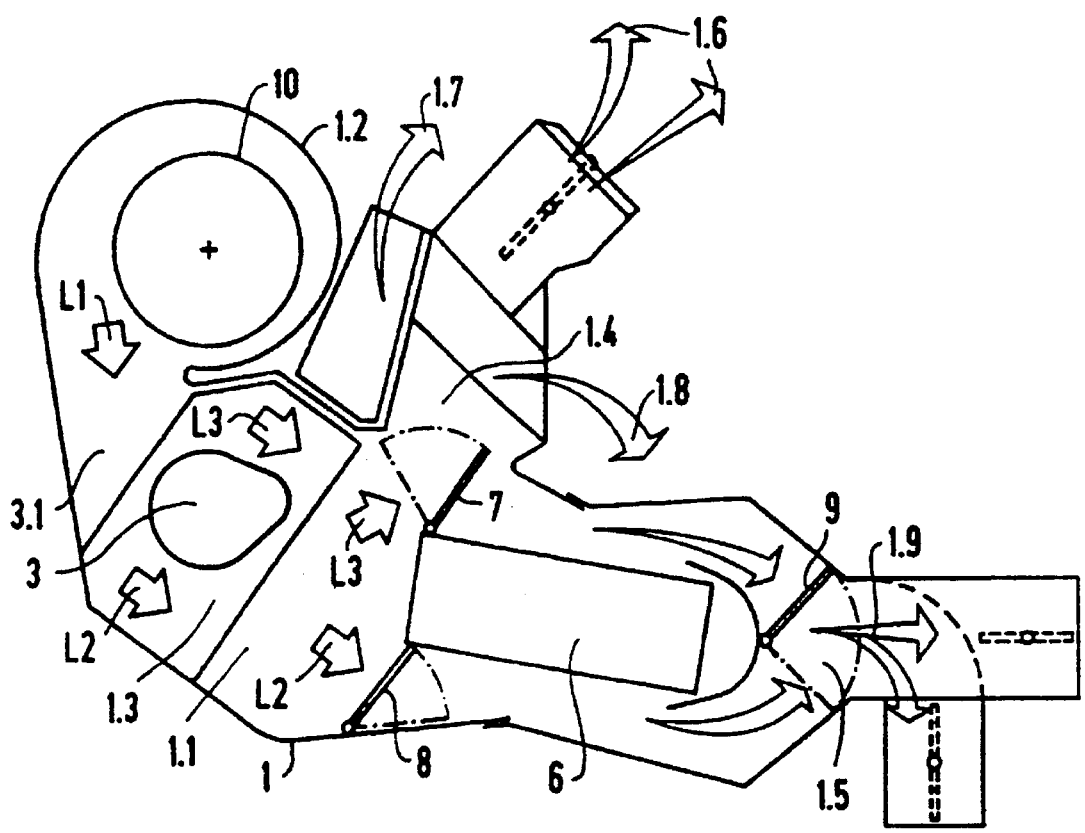
Figure 6:
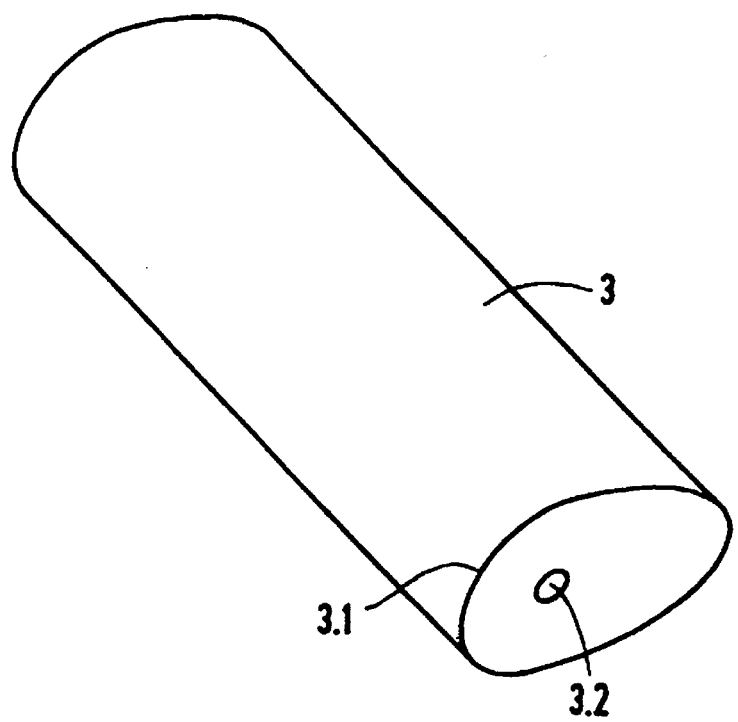

FIG. 2 and FIG. 6, in particular, depict an air-guide device 3 of an elliptical roll body 3 arranged with its wide side 3.1 transverse to an incoming air flow L1, with a first or second output-side air flow L2 or L3 diverted above or below the roll body 3.

Figure 3:
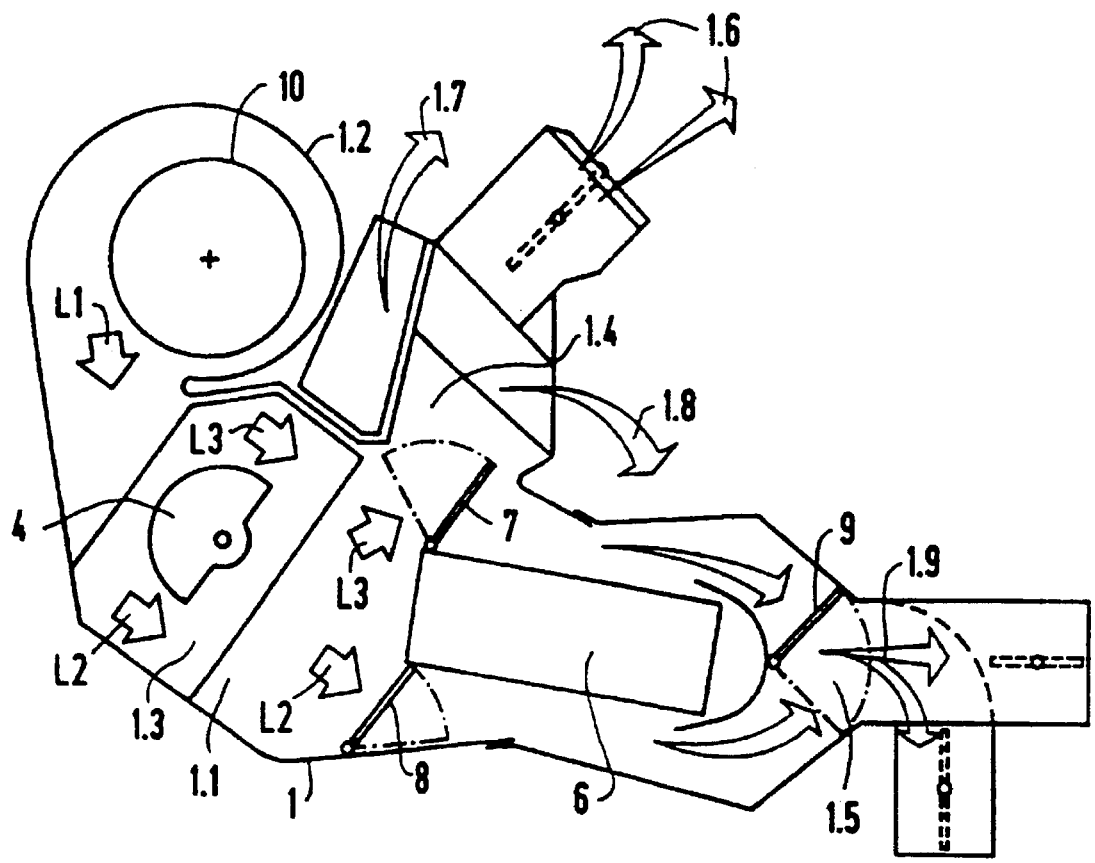
Figure 8:
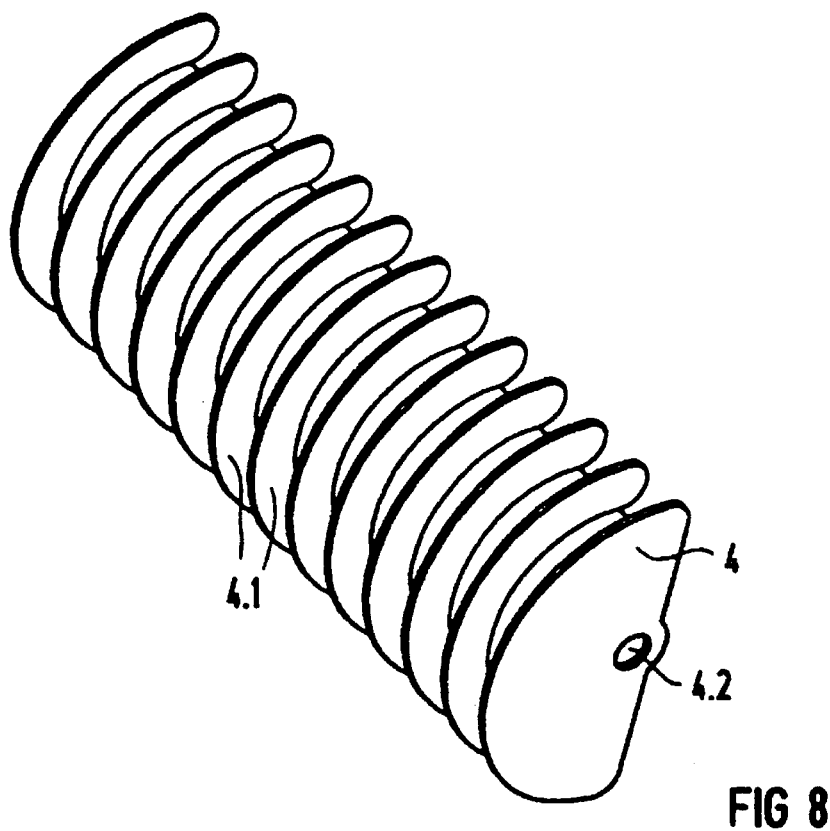

FIG. 3 and FIG. 8, in particular, depict an air-guide device of a preferably semicylindrical roll body 4 arranged transverse to the incoming air flow L1, with vertical air-guide ribs 4.1 arranged on its cylinder sleeve part oppositely directed to the incoming air flow L1 and with an air flow L2 or L3 diverted above or below the roll body 4.

Figure 4:
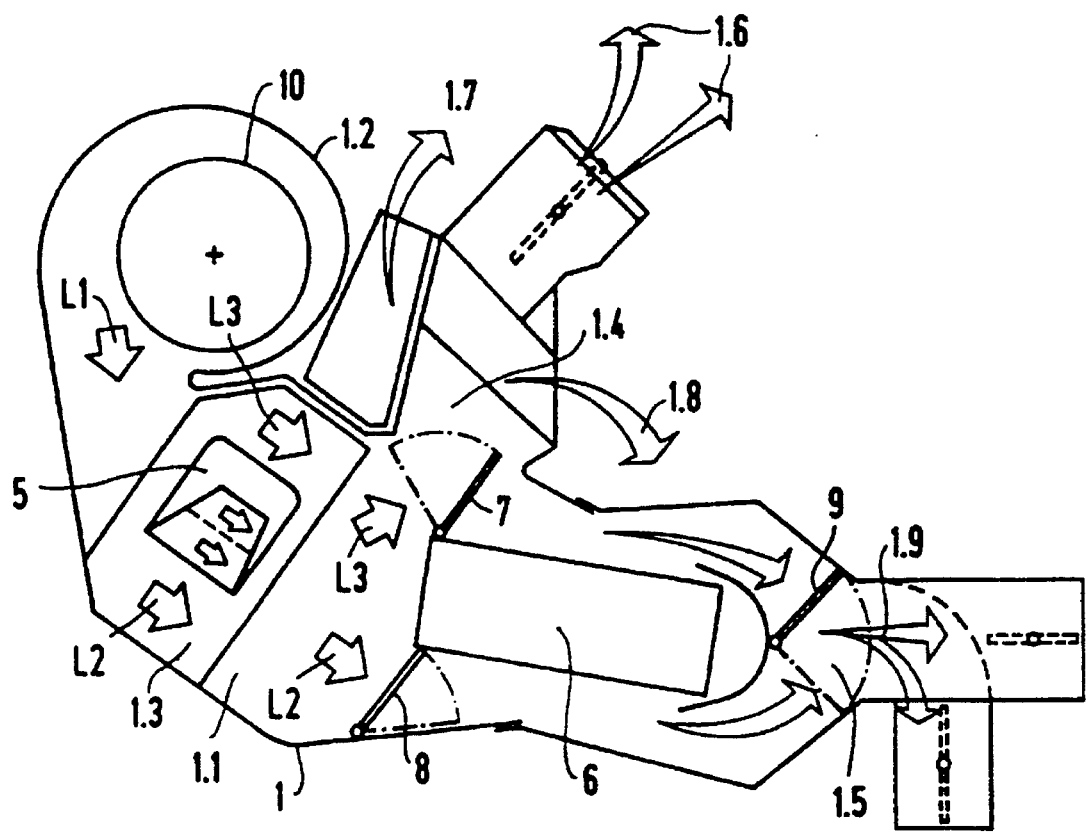
Figure 7:
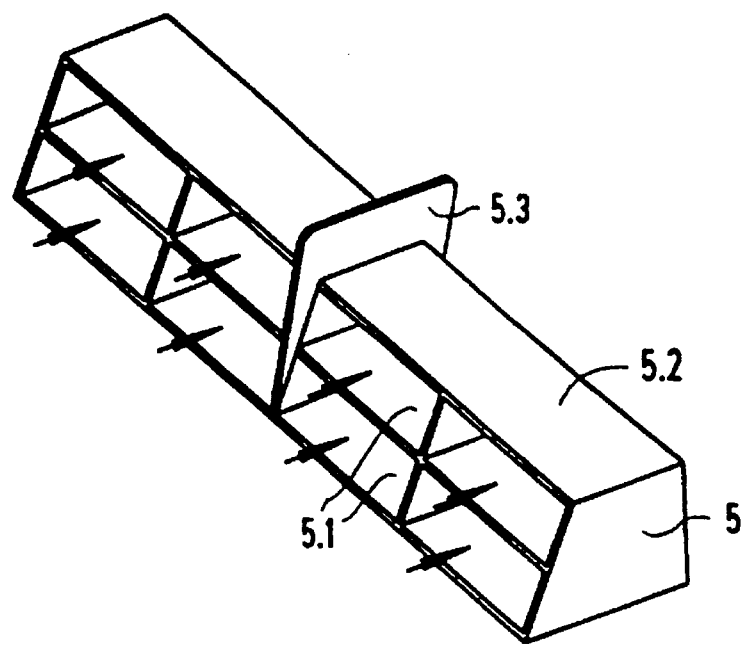

FIG. 4 and FIG. 7, in particular, depict an air-guide device with an air-guide grid 5 arranged transverse to the incoming air flow L1, with flow-through chambers 5.1, which run in the direction of the feed-through duct 1.1 and increase the volume of air flowing therethrough. An output air flow L2 or L3 is diverted above or below an air-guide-grid frame 5.2. An additional air line is reachable, similarly to the case of the vertical air-guide ribs in the exemplary embodiment according to FIG. 8, through at least one middle air-guide segment 5.3, which advantageously contributes to the partitioning of an incoming air flow (L1). In some instances, this air flow shows lateral asymmetry. It is divided into substantially the same laminar air-flow constituents to the left vehicle side, and the right vehicle side when it enters into the front-seat-area mixing chamber 1.4.

As is especially apparent from FIG. 5–8, the air-guide devices have fixing connector receptacles 2.2; 3.2; 4.2—preferably running in the insertion direction, which enable them to be secured to corresponding mating connector receptacles (not shown here) in the installation space 1.3, on wall parts of the unit housing 1.

For additional noise reduction, it is advantageously provided, as especially indicated in FIG. 5, to furnish the air-guiding surfaces of the air-guide device with a noise-absorbing, in particular sprayed-on, surface 2.1.

What is claimed is:

1. A heater/air conditioner kit for use in a motor vehicle, comprising:

a unit housing having a feed-through duct, said housing receiving an incoming air flow and delivering said air flow to at least one air outlet;

an installation space in said unit housing;

an evaporator; and an air guide device;

wherein said evaporator and said air-guide device are separately mountable in said installation space, wherein said evaporator is mounted in said installation space when the kit is used as an air conditioner and wherein said air-guide device is mounted in said installation space when the kit is used as a heater;

wherein said air-guide device provides air guidance free of turbulence and is arranged transverse to said incoming air flow with a first output-side air flow below said air-guide device and a second output-side air flow above said air-guide device.

2. The kit of claim 1 wherein the air-guide device of claim 1 directs one output air flow towards a heat exchanger arranged in the unit housing and a second output air flow towards an air-mixing chamber.

3. The kit according to claim 1 wherein the air-guide device is fixed in an operational position by being installed laterally into the installation space, and said air-guide device is comprised of air-guide elements arranged along a longitudinal axis directed essentially transverse to the oncoming air flow in said operational position.

4. The kit according to claim 2 wherein the air-guide device is fixed in an operational position by being installed laterally into the installation space, and said air-guide device is comprised of air-guide elements arranged along a longitudinal axis directed essentially transverse to the oncoming air flow in said operational position.

5. The kit of any of claims 1, 2, 3 or 4 wherein the air-guide device is comprised of a cylindrical roll body arranged essentially transverse to the incoming air flow such that it divides the incoming air flow into two output air flows.

6. The kit of any of claims 1, 2, 3 or 4 wherein the air-guide device is comprised of a elliptical roll body arranged with its wide side essentially transverse to the incoming air flow such that it divides the incoming air flow into two output air flows.

7. The kit of any of claims 1, 2, 3 or 4 wherein the air-guide device is comprised of a semicylindrical roll body arranged transverse to the incoming air flow, with vertical air-guide ribs arranged in a circumferential orientation on its cylinder sleeve part such that it divides the incoming air flow into two output air flows.

8. The kit of any of claims 1, 2, 3 or 4 wherein the air-guide device is comprised of an air-guide grid arranged transverse to the incoming air flow, with flow-through chambers that run in the direction of a feed-through duct and which diverts the incoming air flow into an output air flow above or below the air-guide frame.

9. The kit of claim 7 wherein the air-guide device is comprised of at least one air-guide segment above the air-guide grid frame that directs an output air flow to a mixing chamber and a front, middle-level air outlet into the motor vehicle cabin.

10. The kit of any of claims 1, 2, 3 or 4 wherein the air-guide device is comprised of an injection-molded plastic part.

11. The kit of any of claim 5 wherein the air-guide device is comprised of an injection-molded plastic part.

12. The kit of any of claim 6 wherein the air-guide device is comprised of an injection-molded plastic part.

13. The kit of any of claim 7 wherein the air-guide device is comprised of an injection-molded plastic part.

14. The kit of any of claim 8 wherein the air-guide device is comprised of an injection-molded plastic part.

15. The kit of any of claims 1, 2, 3 or 4 wherein the air-guide device is comprised of air-guide surfaces that are provided with a noise-absorbing surface.

16. The kit of any of claim 5 wherein the air-guide device is comprised of air-guide surfaces that are provided with a noise-absorbing surface.

17. The kit of any of claim 6 wherein the air-guide device is comprised of air-guide surfaces that are provided with a noise-absorbing surface.

18. The kit of any of claim 7 wherein the air-guide device is comprised of air-guide surfaces that are provided with a noise-absorbing surface.

19. The kit of any of claim 8 wherein the air-guide device is comprised of air-guide surfaces that are provided with a noise-absorbing surface.

20. The kit of any of claims 1, 2, 3 or 4 wherein the air-guide device has fixing connector receptacles by which it is secured to corresponding mating connector receptacles in the installation space.

21. A method of assembling a heater/air conditioner unit for use in a motor vehicle, comprising:

providing a unit housing having a feed-through duct, said housing for receiving an incoming air flow and delivering said air flow to at least one air outlet; said housing including an installation space therein;

mounting either one of two exchangeable parts (A) or (B) in said installation space, wherein part (A) is an evaporator mounted in said installation space when the unit is used as an air conditioner; and part (B) is an air-guide device mounted in said installation space when the unit is used as a heater; wherein said air-guide device provides air guidance free of turbulence and is arranged transverse to said incoming air flow with a first output-side air flow below said air-guide device and a second output-side air flow above said air-guide device; and exchanging parts (A) and (B) to change use of the unit.

* * * * *